United States Patent [19]
Kuhn et al.

[11] Patent Number: 4,803,875
[45] Date of Patent: Feb. 14, 1989

[54] APPARATUS FOR DETERMINING THE FLOW RATE OF A FLOWING MEDIUM

[75] Inventors: Ulrich Kuhn, Renningen; Sybille Stumpf, Markgroningen, both of Fed. Rep. of Germany

[73] Assignee: Robert Bosch GmbH, Stuttgart, Fed. Rep. of Germany

[21] Appl. No.: 107,149

[22] Filed: Oct. 13, 1987

[30] Foreign Application Priority Data

Nov. 8, 1986 [DE] Fed. Rep. of Germany ....... 3638137

[51] Int. Cl.$^4$ ............................................... G01F 1/68
[52] U.S. Cl. ................................................. 73/204.26
[58] Field of Search ........................................... 73/204

[56] References Cited
U.S. PATENT DOCUMENTS 4,399,697  8/1983  Kohama et al. ..................... 73/204
4,449,402  5/1984  Eiermann et al. ..................... 73/204

Primary Examiner—Herbert Goldstein
Attorney, Agent, or Firm—Edwin E. Greigg

[57] ABSTRACT

An apparatus for determining the flow rate of a flowing medium having a substrate fastened at one end with a resistor arrangement disposed on the substrate which includes a layer-like measuring resistor ($R_S$) and a layer-like heating resistor ($R_H$). The heating output is regulated such that the measuring resistor ($R_S$) has a constant electrical resistance, representing a flow rate of the flowing medium. By suitable provisions, such as a meandering pattern for the heating resistor ($R_H$), the local resistance of the heating resistor ($R_H$) crosswise to the flow direction is made to decrease toward the fastened end. Thus, the temperature generated by means of the heating resistor ($R_H$) inside the substrate and the measuring resistor ($R_S$) decreases toward the fastened end.

23 Claims, 3 Drawing Sheets

APPARATUS FOR DETERMINING THE FLOW RATE OF A FLOWING MEDIUM

RELATED PATENT APPLICATION

This application is co-pending with application filed, Nov. 8, 1986, assigned Ser. No. 107,446, and assigned to Robert Bosch GmbH of Stuttgart, Federal Republic of Germany.

BACKGROUND OF THE INVENTION

The invention is based on an apparatus for determining the flow rate, or mass, of a flowing medium as defined hereinafter. From U.S. Pat. No. 4,399,697, an apparatus is known that has two resistors embodied as films on a substrate; the first film acts as a heating resistor and is secured directly on the substrate and the second film is embodied as a temperature-dependent measuring resistor and rests on the first film, with an electrically insulating film located between them. The insulating film separating the heating resistor and the measuring resistor is so thin that good heat transmission from the heating resistor to the measuring resistor is possible. Variations in the flow rate lead to a variation in the transmission of heat at the surface of the measuring resistor and the substrate and, since the measuring resistor is temperature-dependent, to a variation in the electrical resistance of the measuring resistor. The result is imbalancing of a measuring circuit, which is compensated for by varying the heating current at the heating resistor. Serving as the standard for the mass or flow rate of the flowing medium is the electrical power supplied to the heating resistor. An additional temperature-dependent resistor, which is disposed on an additional substrate, serves to balance the temperature of the medium.

A disadvantageous feature of this known apparatus is that not only the flow of heat convectively given up to the medium to be measured, but also the flow of heat that is transferred by thermal conduction from the substrate to the substrate holder, is detected. Since the substrate has a large thermal capacity in comparison with the resistors, unwanted heat transmission of this kind slows the starting up process that lasts until the required operating temperature of the measuring apparatus is reached and also makes for a slow response to changes in the flow rate of the medium. The adaptation or restoration of the temperature profile in accordance with the stationary temperature profile takes place only after a certain time has elapsed. The cause of this is the large temperature drop at the transition point between the heated and the unheated zone of the substrate. At such points of large temperature gradients, lateral heat outflows are particularly pronounced, because as is well known, heat flows in the direction of the decreasing temperature gradient. During the time of the temperature compensation, the electrical energy supplied to the heating resistor can be utilized only with error as a standard for the mass or flow rate of the flowing medium. When the known apparatus is used to detect the aspirated air flow rate in an internal combustion engine, this can cause inaccuracies from time to time in the adaptation of the fuel-air mixture.

The known apparatus also has the disadvantage of a strong tendency to becoming soiled, since especially when it is used in the intake tube of an internal combustion engine, particles of dirt from the intake tube atmosphere become deposited on the leading edge of the measuring resistor and over long-term operation negatively affect the measurement result.

An apparatus for determining the flow rate of a flowing medium is also known (German Pat. No. 31 27 081) which has also issued as U.S. Pat. No. 4,449,402, in which the heating output is not constant over the entire surface area of a heatable measuring resistor, but instead decreases in the direction of the medium flow. This is attained by providing that the width of the resistor tracks, which extend transverse to the direction of the flow, increases in the flow direction. As a result, it is possible to keep the temperature of the measuring resistor constant over the length swept by the flow.

OBJECT AND SUMMARY OF THE INVENTION

It is an object of the invention to devise an apparatus that has a simple mechanical and electronic design for determining the flow rate of a flowing medium, a short startup time, a short response time to changes in flow rate, and high accuracy in measurement even after long-term operation.

The apparatus according to the invention has the advantage of both a short startup time and a short response time to changes in the mass or flow rate of the flowing medium, since the distribution of the heating output of the heating resistor and the location of the heating resistor relative to the measuring resistor are dimensioned such that a heat outflow to the substrate and from there to the substrate fastening has no influence on the result of measurement. This advantage is attained by providing that the heating resistor extends farther than the measuring resistor in the direction of the substrate fastening, and that the local resistance of the heating resistor decreases toward the fastening. The stationary temperature profile of the measuring resistor is rapidly restored, since the temperature profile generated by the heating resistor in the substrate and hence in the measuring resistor does not have any relatively large jumps and discontinuities. Because of the rather "gentle" course of the temperature drop in the substrate, the outflows of heat within the plane of the substrate remain low. The apparatus according to the invention also has the advantage that lesser heating currents than in known apparatuses are sufficient.

Herein is also disclosed further advantageous developments of and improvements to an apparatus which is considered to be new and inventive. A particularly advantageous feature is at least one thermally insulating slit cut into the substrate for preventing an objectionable flow of heat from and to the resistors.

It is also advantageous to secure the measuring resistor not too close to the leading edge of the substrate, so as to keep the tendency toward soiling to a minimum in the vicinity of the measuring resistor.

Further resistors of the apparatus are advantageously accommodated on the same substrate. Since the effects of soiling is not as serious for these resistors as for the measuring resistor, they can be placed upstream of the measuring resistor.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
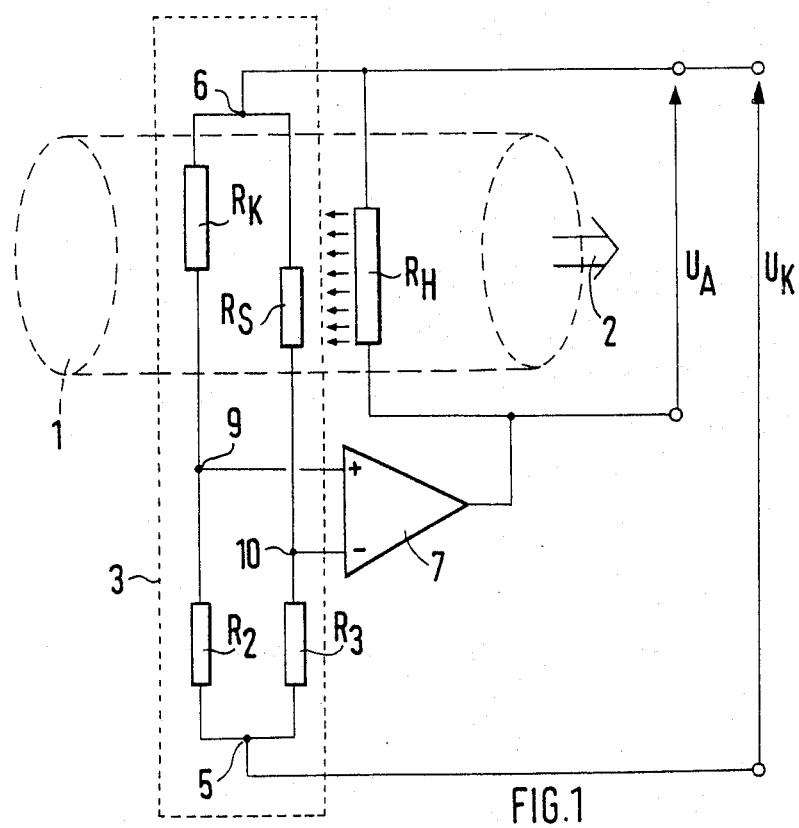
FIG. 1 is a circuit diagram of the invention.

In FIG. 1, reference numeral 1 indicates a tube through which a fluid medium flows; the direction of flow of the medium is represented by an arrow 2. The tube 1 may be, for example, the intake tube of an internal combustion engine. A resistor $R_S$, which serves to ascertain the flow rate through the tube 1 and will be referred to hereinafter as the measuring or sensing resistor, is introduced into the tube 1. This measuring resistor $R_S$ is embodied as a resistor or film resistor formed by different layers on a substrate, not shown in FIG. 1, and is a component of a resistance detection device 3, embodied for example as a bridge circuit. This resistance detection device 3 is completed with the resistors $R_K$, $R_2$ and $R_3$ and is connected as a resistor measuring bridge. Beginning at a base point 5, the resistors are connected in series in each bridge branch as follows: $R_2$, $R_K$ in one branch, and $R_3$ and $R_S$ in the other. The connection leads of the resistors $R_K$ and $R_S$ are joined at a point 6. The signals of a point 9, as the connecting point of the resistors $R_K$ and $R_2$, and of a point 10, as the connecting point of the resistors $R_S$ and $R_3$, are supplied to a regulating amplifier 7.

The regulating amplifier 7 is embodied for example as a differential amplifier, but the invention is not limited to such differential amplifiers but instead is applicable in general to any analog and digital regulating function.

The initial variable of the regulating amplifier 7 is supplied to a heating resistor $R_H$, the other connecting lead of which is connected to the point 6, so that the overall result is a closed loop.

It should be stressed that the resistance detection device 3 can be realized not only in the form of a bridge circuit but by means of any other resistance measuring circuits as well. To realize the invention, a bridge circuit is accordingly not absolutely necessary, and measuring circuits similar to bridges are also conceivable.

The basic operation of this device is as follows:

The initial current of the regulating amplifier 7 causes heating of the resistor $R_H$, henceforth called the heating resistor; the heating output at this resistor is substantially determined by the bridge diagonal voltage at the regulating amplifier 7. The heating resistor $R_H$ is embodied such that it is in the most direct possible thermal contact with the measuring resistor $R_S$. Because of the good thermal contact between $R_H$ and $R_S$, the measuring resistor $R_H$ is brought to an elevated temperature that is far above the temperature of the medium. If the mass flowing through the tube 1, or in other words the flow rate of the medium, now varies, then because of the changed convective heat transmission the temperature of the measuring resistor $R_S$ varies as well, and since the measuring resistor $R_S$ has a temperature coefficient not equal to zero, the resistance detection device 3 becomes imbalanced, causing the regulating amplifier 7 to vary the initial current that flows to the heating resistor $R_H$. That is, changes in the measuring resistor $R_S$ caused by an outflowing or inflowing amount of heat are always compensated for via a closed loop by a variation in the heating output of the heating resistor $R_H$, so that the measuring resistor $R_S$ is kept at a predetermined resistance value. The heating current, the heating output or the output voltage $U_A$ of the regulating amplifier 7 are a measure of the flow rate or mass of the flowing medium.

However, since the heating current, the heating output or the output voltage $U_A$ of the regulating amplifier 7 also depend on the temperature of the flowing medium, fluctuations in the temperature of the flowing medium must be compensated for. To this end the compensating resistor $R_K$ is provided, which, like the heating resistor $R_H$ and the measuring resistor $R_S$, is embodied in filmlike and is likewise exposed to the flowing medium and is made up of a pair of series-connected resistors. The compensating resistor $R_K$ is calibrated in such a manner—for instance, by meandering cuts—that the temperature coefficient of the compensating resistor $R_K$ and of the measuring resistor $R_S$ are at a predetermined ratio to one another, depending on the evaluation method used to ascertain the signal size.

The resistance detection device 3 is completed by a first reference resistor $R_2$, which is located between the base point 5 and point 9, and a second reference resistor $R_3$, which is located between the base point 5 and point 10. It is unnecessary to expose the reference resistors $R_2$ and $R_3$ to the flowing medium, but $R_2$ and $R_3$ should be in the closest possible thermal contact with one another, which makes a close tolerance in the temperature coefficient of the resistors $R_2$ and $R_3$ unnecessary.

Figure 2:
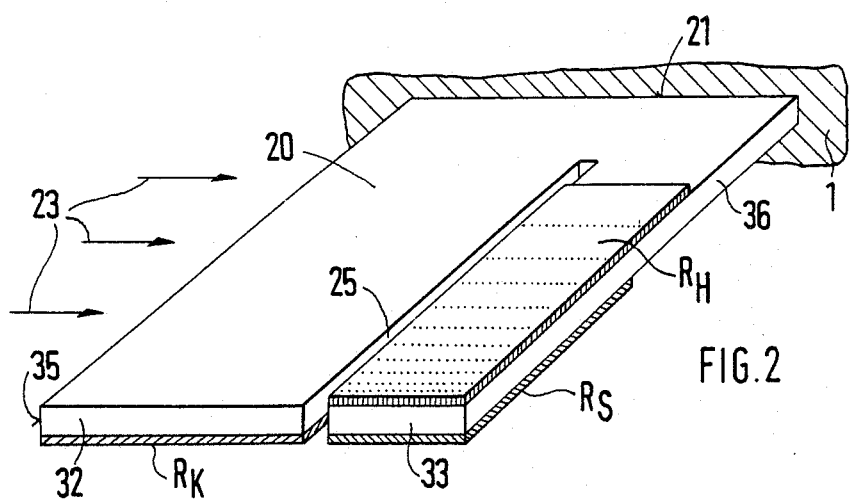
FIG. 2 shows an apparatus according to the invention for determining the flow rate of a flowing medium.

FIG. 2 shows an embodiment of the invention having the heating resistor $R_H$, measuring resistor $R_S$, and compensating resistor $R_K$. All these resistors are disposed as thin films on a platform-like substrate serving as a carrier, which is approximately rectangular and is secured on one of its shorter sides, in the vicinity of a fastening 21, on the tube 1 through which the medium to be measured flows. Crosswise to the medium flow direction indicated by arrows 23, a slit 25 is cut into the substrate 20, beginning at the end of the substrate 20 remote from the fastening 21 and extending almost to the fastening 21. The slit 25 divides the substrate 20 into a first lip 32 and a second lip 33. The first lip 32 is defined on one side by the leading edge 35 of the substrate 20 oriented counter to the flow direction and on the other by the slit 25; the second lip 33 of the substrate 20 is defined on one side by the slit 25 and on the other by a trailing edge 36 of the substrate 20.

The resistors $R_H$, $R_S$ and $R_K$ each cover the portion of the lips 32, 33 remote from the fastening 21 and are advantageously disposed such that the compensating resistor $R_K$ is disposed on the first lip 32 and the measuring resistor $R_S$ is disposed on the second lip 33. The heating resistor $R_H$, in the exemplary embodiment of FIG. 2, is located on the side of the second lip 33 of the substrate 20 remote from measuring resistor $R_S$, and like the measuring resistor $R_H$ extends as far as the edge of the second lip 33 remote from the fastening 21. The measuring resistor $R_S$ is thus disposed on one side and the heating resistor $R_H$ is disposed on the other side of the second lip 33 of the substrate 20; $R_S$ and $R_H$ are in thermal contact with one another via the substrate 20, having good thermal conductivity, disposed between them.

The length of the slit 25 is dimensioned such that it extends farther toward the fastening 21 than does each of the resistors $R_H$, $R_S$ and $R_K$, as a result of which very good thermal separation of the lips 32, 33 and hence of the individual resistors as well is attained.

The fabrication of the apparatus is simplified substantially if those resistor films that form the compensating resistor $R_K$ and the measuring resistor $R_S$ are made of the same material and are made in the same manufacturing step. To make the necessary individual resistor, the resistor layers can be provided with meandering structures. This can be done by means of laser cuts, not shown in the drawing.

To prevent flows of heat out of the vicinity of the measuring resistor $R_S$ in the direction of the fastening 21, the heating resistor $R_H$ extends farther toward the fastening 21 than the measuring resistor $R_S$. As a result of this geometrical arrangement of the measuring resistor $R_S$, the heated zone of the substrate 20 defined by the expansion of the heating resistor $R_H$ protrudes farther toward the fastening 21 than the measuring resistor $R_S$, thereby preventing an unwanted outflow of heat out of the vicinity of the measuring resistor $R_S$ in the direction of the fastening 21, and the speed of response of the measuring resistor $R_H$ to flow rate changes is thereby increased, since when there are flow rate changes a new temperature profile need not be established each time for the measuring resistor $R_H$.

According to the invention, the local electrical resistance of the heating resistor $R_H$ is designed such that the resistance per unit of surface area (that is, the specific resistance) is at a maximum on the end of the substrate 20 remote from the fastening and decreases toward the fastening 21. This kind of adaptation of the local resistance can be done for example by providing meandering patterns on the resistor film of the heating resistor $R_H$, that is, by removing resistor material, for example by laser, but various other provisions can also be used successfully as well. For instance, the desired resistor profile can be obtained by suitable layering of a plurality of resistor films extending variously far toward the fastening 21 or assuming a different location on the substrate 20, or resistor layers having different specific resistances can be disposed next to one another on the substrate 20.

Figure 3:
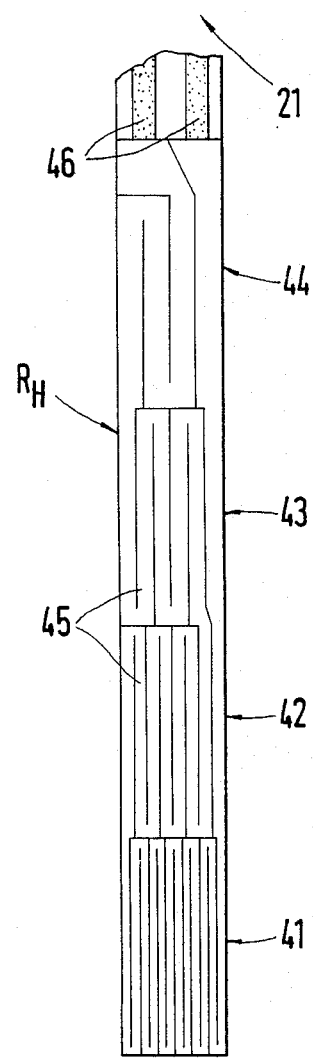
FIG. 3 is a detail of FIG. 2 showing a further embodiment of the invention.

FIG. 3, as a detail of FIG. 2, shows a suitable meandering pattern of the heating resistor $R_H$. The heating resistor $R_H$ is divided into a plurality of heating zones 41, 42, 43, 44 formed by resistor tracks 45, and the width of the resistor tracks 45 of the various heating zones 41, 42, 43, 44 and thus their cross-sectional area increases toward the fastening 21; the resistance per unit of surface area accordingly decreases. Hence the temperature profile generated within the substrate 20 and the measuring resistor $R_S$ by means of the heating resistor $R_S$ takes a decreasing course toward the fastening 21. The layout of the heating resistor $R_H$ can thus be arranged such that the resistor tracks 45 extend in the flow direction or, as shown in FIG. 3, crosswise to the flow direction, or in any other manner.

Both calculations and tests have shown that the proposed profiling of the heating resistor $R_H$ both shortens the startup time and accelerates the speed of response by the apparatus to changes in the flow rate of the flowing medium, and there is also the additional advantage of a reduced consumption of electricity by the heating resistor $R_H$.

The supply of current to the heating resistor $R_H$ can be done by current tracks 46 secured to the substrate 20. This is done in the same manner to supply current to the resistors $R_S$ and $R_K$.

Naturally the concept on which the invention is based is not limited to the exemplary embodiment described above. In addition to the various possibilities already mentioned for attaining a resistor profile inside the heating resistor $R_H$, the disposition of the measuring resistor $R_S$ relative to the heating resistor $R_H$ can also be done in some other way. For instance, the measuring resistor $R_S$ can be underlaid by the heating resistor $R_S$, with an electrically insulating layer disposed between them. The particular advantage of this variant is that the electrically insulating layer can be made with a lesser thickness than can the substrate 20, the material thickness of which is responsible for the stability of the apparatus and thus is subject to certain limitations.

Figure 4:
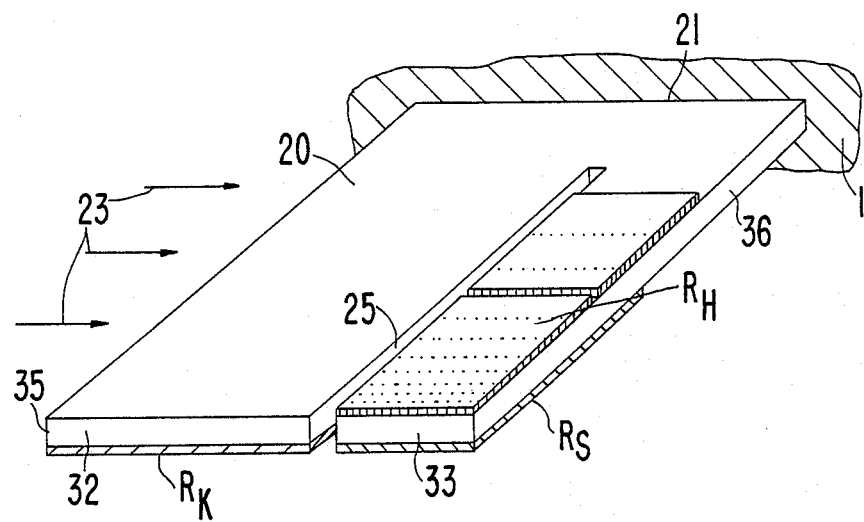
FIGS. 4 and 5 are modifications of the device shown in FIG. 2.

FIG. 4 illustrates the heating resistor $R_H$ separated into two separate sections in the same plane by a spacing 50 extending from the slit 25 to the trailing edge 36.

Figure 5:
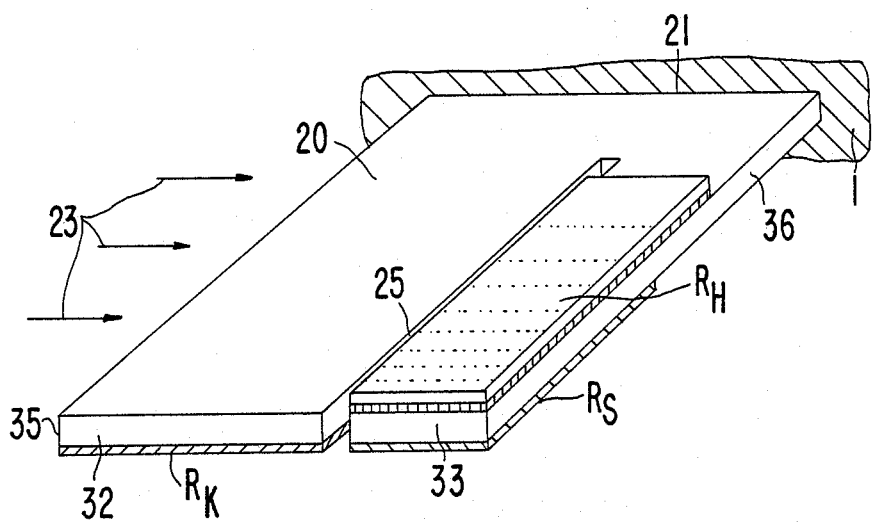

FIG. 5 illustrates two heating resistor layers $R_H$ disposed in planes layered one above the other.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for determining the flow rate of a flowing medium through a flow passage, having a substrate retained by at least one end in the flow passage by a fastening means, said substrate having a leading edge and a trailing edge, a layer-like, temperature-dependent measuring resistor as well as a layer-like heating resistor located on said substrate and spaced from said fastening means, a resistor detection device which regulates a heat output of said heating resistor as a function of the flow rate of the flowing medium, said heating resistor and said measuring resistor being disposed on said substrate in an electrically insulated manner, said heating resistor ($R_H$) extends farther toward said fastening means (21) from an end opposite from said fastening means than said measuring resistor ($R_S$) and the resistance value per unit of surface area of the heating resistor ($R_H$) decreases toward the fastening means (21).

2. An apparatus as defined by claim 1, in which said heating resistor ($R_H$) is divided into individual resistor tracks (45) having a cross-sectional area that increases toward the fastening means (21).

3. An apparatus as defined by claim 2, wherein said resistor tracks (45) extend in the flow direction of the medium.

4. An apparatus as defined by claim 2, wherein said resistor tracks (45) extend crosswise to the flow direction of the medium.

5. An apparatus as defined by claim 1, wherein said heating resistor ($R_H$) comprises at least two resistor layers.

6. An apparatus as defined by claim 5, wherein said at least two resistor layers are located in one plane adjacent one another.

7. An apparatus as defined by claim 5, wherein said at least two resistor layers are disposed in planes layered one above the other.

8. An apparatus as defined by claim 1, in which said heating resistor ($R_H$) and said measuring resistor ($R_S$) are located downstream of a slit (25) made in the substrate (20) crosswise to the flow direction and toward the fastening means (21).

9. An apparatus as defined by claim 2, in which said heating resistor ($R_S$) and said measuring resistor ($R_S$)

are located downstream of a slit (25) made in the substrate (20) crosswise to the flow direction and toward the fastening means (21).

10. An apparatus as defined by claim 3, in which said heating resistor ($R_S$) and said measuring resistor ($R_S$) are located downstream of a slit (25) made in the substrate (20) crosswise to the flow direction and toward the fastening means (21).

11. An apparatus as defined by claim 4, in which said heating resistor ($R_S$) and said measuring resistor ($R_S$) are located downstream of a slit (25) made in the substrate (20) crosswise to the flow direction and toward the fastening means (21).

12. An apparatus as defined by claim 5, in which said heating resistor ($R_S$) and said measuring resistor ($R_S$) are located downstream of a slit (25) made in the substrate (20) crosswise to the flow direction and toward the fastening means (21).

13. An apparatus as defined by claim 6, in which said heating resistor ($R_S$) and said measuring resistor ($R_S$) are located downstream of a slit (25) made in the substrate (20) crosswise to the flow direction and toward the fastening means (21).

14. An apparatus as defined by claim 7, in which said heating resistor ($R_H$) and said measuring resistor ($R_S$) are located downstream of a slit (25) made in the substrate (20) crosswise to the flow direction and toward the fastening means (21).

15. An apparatus as defined by claim 8, in which said slit (25) extends farther toward the fastening means (21) than does the heating resistor ($R_H$).

16. An apparatus as defined by claim 9, in which said slit (25) extends farther toward the fastening means (21) than does the heating resistor ($R_H$).

17. An apparatus as defined by claim 10, in which said slit (25) extends farther toward the fastening means (21) than does the heating resistor ($R_H$).

18. An apparatus as defined by claim 11, in which said slit (25) extends farther toward the fastening means (21) than does the heating resistor ($R_H$).

19. An apparatus as defined by claim 12, in which said slit (25) extends farther toward the fastening means (21) than does the heating resistor ($R_H$).

20. An apparatus as defined by claim 13, in which said slit (25) extends farther toward the fastening means (21) than does the heating resistor ($R_H$).

21. An apparatus as defined by claim 14, in which said slit (25) extends farther toward the fastening means (21) than does the heating resistor ($R_H$).

22. An apparatus as defined by claim 8, in which a further resistor ($R_K$) is located upstream of the slit (25).

23. An apparatus as defined by claim 15, in which a further resistor ($R_K$) is located upstream of the slit (25).

* * * * *